Patented Sept. 26, 1939

2,173,895

UNITED STATES PATENT OFFICE 2,173,895

PROCESS FOR PRODUCING SULPHIDE PIGMENTS

James Eliot Booge, Wilmington, Del., assignor to E. I. du Pont de Nemours & Company, Wilmington, Del., a corporation of Delaware No Drawing. Application July 14, 1937, Serial No. 153,514

8 Claims. (Cl. 134—58)

This invention relates to the manufacture of sulphide pigments, and more particularly to a commercially economical method for producing zinc, cadmium and antimony sulphide pigments from solutions of the respective metallic thiosulphates.

In the American Journal of Science, volume 34, 1912, Allen and Crenshaw set forth that at 100° C. zinc sulphide is precipitated quantitatively from solutions of sodium thiosulphate and zinc salts, the recation being represented by the following equation:

(1) $4Na_2S_2O_3 + ZnSO_4 = 4Na_2SO_4 + ZnS + 4S$ 

They also state that sulphur dioxide and hydrogen sulphide are formed by secondary reactions.

The manufacture of zinc sulphide pigments from solutions of sodium thiosulphates and zinc salts has been suggested heretofore, but this manner of pigment production and the resultant product has many serious disadvantages. For example, the high cost of sodium thiosulphate renders such a process commercially prohibitive, while the formation of considerable and objectionable quantities of free sulphur during the reaction produces a pigment of poor quality and very undesirable color. This sulphur tenaciously adheres to the pigment product and cannot be removed during subsequent processing or calcination. Another serious disadvantage which such a process affords is the necessity of resort to long and repeated washing operations in an attempt to remove sodium salts present in the pigment and which act as fritting agents during calcination, forming objectionable pigment agglomerates and manifesting themselves in the calcined product in the form of hard, gritty particles.

I have discovered that these and other disadvantages arising by reason of sodium thiosulphate use may be completely obviated and a sulphide pigment obtained which will exhibit improved color, quality and texture if an alkaline earth thiosulphate is caused to be first reacted with either a zinc, cadmium or antimony salt to form a metal thiosulphate, and the resultant compound then decomposed under definitely controlled conditions to yield the desired and particular sulphide pigment.

Additionally, I have found that my novel process is particularly adaptable to the production of zinc sulphide pigments per se, as well as extended zinc sulphide pigments. Accordingly, I will proceed to describe my invention in its application to zinc sulphide pigment production, it being understood, of course, that the cadmium or antimony sulphide pigments are also obtainable by similar methods, as will be pointed out more particularly hereinafter.

In adapting my invention to practice, I may employ any type of alkaline earth thiosulphate, such as calcium, strontium or magnesium thiosulphates, although because of its economic availability, I preferably utilize calcium thiosulphate. The latter may be conveniently and economically prepared by passing sulphur dioxide into a water slurry of lime to which sulphur has been added, the resulting calcium thiosulphate solution being separated from the unreacted lime and foreign matter present by suitable filtration or other desired or equivalent means. Or, if desired, a solution of pure zinc thiosulphate may be obtained by passing sulphur dioxide into a water slurry of zinc oxide and sulphur, the impurities being readily filtered out along with unreacted zinc oxide.

The calcium thiosulphate solution obtained is then reacted with an aqueous solution of a suitable zinc compound, such as zinc sulphate, the reaction involved being represented by the following equation:

(2) $ZnSO_4 + CaS_2O_3 + 2H_2O \rightarrow$
$ZnS_2O_3 + CaSO_4 \cdot 2H_2O$ 

The zinc thiosulphate solution may be readily separated from the gypsum by filtration or other equivalent means. The gypsum obtained, after proper conditioning, becomes an excellent extender of superior color and may be used advantageously to further extend the zinc sulphide product of my process or may be used for other pigmentary purposes.

The next step in my novel process consists in the decomposition of the zinc thiosulphate into zinc sulphide and sulphuric acid according to the chemical equation:

(3) $ZnS_2O_3 + H_2O \rightleftharpoons ZnS + H_2SO_4$ 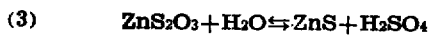

In effecting precipitation of the zinc sulphide, care must be taken to control the reaction so that substantial decomposition to the extent indicated by chemical Equation (1) above does not occur. Generally, and preferably, I effect decomposition by suitably heating or boiling the solution of zinc thiosulphate and neutralizing the acidity developed by such decomposition, as illustrated by chemical Equation (3) above.

While decomposition and neutralization of the acid developed may be accomplished by various means, such as by boiling and addition of an alkaline material sufficient to neutralize the acid as formed, I have found that an improved and superior pigment results, and therefore preferably effect decomposition as follows:

A quantity of calcium carbonate, preferably precipitated calcium carbonate and substantially free of objectionable impurities, calculated as substantially equivalent to the acid which will develop on decomposition, is mixed with the zinc thiosulphate solution, the quantity of calcium carbonate required being based upon previous experience or predetermined with a small sample of the zinc thiosulphate solution. To precipitate zinc sulphide from the zinc thiosulphate and calcium carbonate slurry, said slurry is introduced, preferably slowly, into a vessel containing boiling water, boiling being continued and the addition so regulated as to maintain a pH range in the decomposition vessel of about 4.0 to 6.0, and preferably between 5.0 and 5.5 pH, as determined by a spot test using bromcresol green indicator.

To precipitate, when filtered, dried and calcined, forms an excellent composite zinc sulphide-calcium sulphate pigment of superior color and quality.

In order that the invention may be more clearly understood, the following specific example is given, which is merely illustrative in character and in no wise in limitation of the invention:

Example I

Calcium thiosulphate was prepared by passing sulphur dioxide gas into a slurry of slaked lime and sulphur. After the desired concentration of calcium thiosulphate was formed, the unreacted lime and sulphur together with such impurities as were present were filtered off for reuse in preparing the next batch of calcium thiosulphate.

The clear solution of calcium thiosulphate was free from objectionable impurities such as iron, manganese, etc. Analysis of the solution showed a concentration of 144 gs. of $CaS_2O_3$ per liter.

The calcium thiosulphate solution was then reacted with a chemical equivalent quantity of 40° Bé. zinc sulphate solution. The zinc sulphate solution was free from objectionable impurities, purification having been effected by means well known in the art.

The voluminous precipitate of gypsum that resulted was filtered off and washed free from zinc. Such washing was readily accomplished with a relatively small amount of wash water.

The zinc thiosulphate solution containing 52 gs. of zinc per liter was slowly introduced into a reaction vessel containing boiling water into which steam was being introduced. Boiling was continued during the introduction of the zinc thiosulphate solution and the pH was maintained between 4.5 and 6.0 by the addition of calcium carbonate.

The precipitate was filtered off and when dried and calcined as such was found to be an excellent composite pigment consisting of zinc sulphide and calcium sulphate.

When a portion of the precipitate was subjected to moderate washing the product consisted substantially entirely of zinc sulphide analyzing from 98.5 to over 99% ZnS.

Instead of neutralizing the acidity, developed by decomposition of the zinc thiosulphate, as described above, I have found it practical to add a slurry of lime or of calcium carbonate concurrently with the zinc thiosulphate solution being introduced into the precipitation vessel, as described above.

While my preferred procedure entails gradual introduction of the zinc thiosulphate solution into a reaction vessel containing boiling water, it is also within the scope of my invention to fill or partially fill the reaction vessel with zinc thiosulphate solution, omitting the water, and to effect decomposition by heating. Then, in order to neutralize the acidity resulting from decomposition of the thiosulphate an alkaline material, preferably calcium carbonate or lime $$[CaO \text{ or } Ca(OH)_2]$$

is added as the reaction progresses. Alkaline calcium compounds are preferred because the calcium salts need not be washed out of the zinc sulphide precipitate. Additionally, control of the acidity is most convenient with such calcium compounds.

In some instances I have realized beneficial results by introducing small amounts of calcium hydrosulphide into the reaction vessel either before starting decomposition of the thiosulphate solution or during such decomposition.

When utilizing relatively concentrated solutions more or less calcium sulphate will precipitate with the zinc sulphide. This is particularly advantageous for producing composite pigments comprising zinc sulphide and calcium sulphate. Such composite pigments exhibit superior tinting strength, much higher in value than composite pigments of equal zinc sulphide content prepared by blending zinc sulphide with separately prepared calcium sulphate.

If pure zinc sulphide is desired, I utilize solutions of such concentration that all of the calcium sulphate formed is dissolved in the reaction mass or I may alternatively remove any calcium sulphate (gypsum) formed by further addition of water.

As stated above, I contemplate the manufacture of composite pigments comprising zinc sulphide and calcium sulphate but it is to be understood that my invention comprises precipitation of zinc sulphide on other suitable extenders such as certain silicate extenders, particularly magnesium silicates and aluminum silicates. Other inert extenders such as insoluble fluorides may be employed advantageously.

While I have described my invention in its preferred and particular adaptation in the production of zinc sulphide pigments, it will be obvious to those skilled in the art that other sulphide and/or extended pigments, such as those of cadmium or antimony, are also obtainable in accordance with my invention. Accordingly, by the term "sulphide pigment", here and in the appended claims, I intend to include these types of pigments. In the production of cadmium or antimony sulphide pigments, the respective cadmium or antimony thiosulphates may be obtained by reacting an alkaline earth thiosulphate with a salt of the particular metal, such as a sulphate, the resulting solution of cadmium or antimony thiosulphate then being decomposed in a manner similar to the described zinc thiosulphate decomposition. In the preparation of the thiosulphate of antimony, it will be found preferable to employ more concentrated solutions, these being readily obtainable by utilizing alkaline solutions of antimony compounds.

While I have described various adaptations of my invention wherein certain metal salt solutions are reacted with calcium thiosulphate and the calcium sulphate formed is separated from the resulting thiosulphate solutions prior to decomposition of said thiosulphate, it will be obvious that said separation or filtration step may be omitted entirely or a part only of the calcium sulphate formed may be removed. Thus, it may be desirable to effect decomposition of the thiosulphate in the presence of a part or all of the calcium sulphate, whereby a composite zinc sulphide-calcium sulphate pigment of controlled and widely varying composition results from a practice of the invention.

I claim as my invention:

1. A process for producing a zinc sulphide pigment, comprising reacting calcium thiosulphate with an aqueous solution of zinc sulphate, boiling the resultant zinc thiosulphate to effect its decomposition in the substantial absence of SO₂ evolution, maintaining the zinc thiosulphate solution during boiling at a pH of between about 4.0 and 6.0 by addition of an alkaline reagent, and thereafter calcining the zinc sulphide precipitate to develop its pigment properties.

2. A process for producing a composite zinc sulphide-calcium sulphate pigment, comprising reacting calcium thiosulphate with an aqueous solution of zinc sulphate, subjecting the resultant solution of zinc thiosulphate to boiling to decompose said thiosulphate, maintaining the thiosulphate solution during boiling at a pH value between about 5.0 and 5.5 by adding an alkaline calcium compound to neutralize the acidity developed during said decomposition, and thereafter calcining the precipitated zinc sulphate to develop its pigment properties.

3. A process for producing an insoluble sulphide pigment composition, comprising reacting in aqueous solution an alkaline earth metal thiosulphate with a soluble salt of a metal from the group consisting of zinc, cadmium and antimony, heating a solution of the resultantly formed thiosulphate compound and effecting its decomposition in the substantial absence of SO₂ evolution and in the presence of an alkaline agent adapted to neutralize the acidity which develops during said decomposition, and recovering the precipitated sulphate pigment.

4. A process for producing an insoluble sulphide pigment, comprising reacting in solution an alkaline earth metal thiosulphate with a soluble salt of a metal from the group consisting of zinc, cadmium and antimony, decomposing by heating and without substantial SO₂ evolution the resultantly formed thiosulphate compound while in aqueous solution, during said decomposition maintaining said aqueous solution at a pH of from about 4.0 to 6.0 by alkaline agent addition, and recovering and calcining the precipitated sulphide to develop its pigment properties.

5. A process for producing a sulphide pigment, comprising reacting an alkaline earth metal thiosulphate with a soluble sulphate of a metal from the group consisting of zinc, cadmium and antimony, decomposing by boiling and in the substantial absence of SO₂ evolution the thiosulphate compound which forms, effecting such decomposition in the presence of an alkaline agent adapted to neutralize the acidity which develops during such boiling, and recovering and calcining the precipitated pigment.

6. A process for producing a zinc sulphide pigment, comprising reacting calcium thiosulphate with an aqueous solution of zinc sulphate, decomposing the zinc thiosulphate formed in the substantial absence of SO₂ evolution by boiling said zinc thiosulphate and neutralizing the acidity which develops during said decomposition by addition of an alkaline agent, and calcining the zinc sulphide precipitate to develop its pigment properties.

7. A process for producing a cadmium sulphide pigment comprising reacting calcium thiosulphate with an aqueous solution of cadmium sulphate, decomposing by heating the resultant cadmium thiosulphate while in aqueous solution and in the substantial absence of SO₂ evolution, neutralizing the acidity developed during said decomposition by adding an alkaline agent to said solution, and calcining the recovered cadmium sulphide precipitate to develop its pigment properties.

8. A process for producing an antimony sulphide pigment comprising reacting calcium thiosulphate with an aqueous solution of antimony sulphate, decomposing by heating the resultant antimony thiosulphate while in aqueous solution and in the substantial absence of SO₂ evolution, neutralizing the acidity developed during said decomposition by adding an alkaline agent to said solution, and calcining the recovered antimony sulphide precipitate to develop its pigment properties.

JAMES ELIOT BOOGE.

CERTIFICATE OF CORRECTION.

Patent No. 2,173,895. September 26, 1939.

JAMES ELIOT BOOGE.

It is hereby certified that error appears in the printed specification of the above numbered patent requiring correction as follows: Page 1, first column, line 11, for "recation" read reaction; page 3, first column, lines 31 and 44, claims 2 and 3 respectively, for the word "sulphate" read sulfide; and that the said Letters Patent should be read with this correction therein that the same may conform to the record of the case in the Patent Office.

Signed and sealed this 7th day of November, A. D. 1939.

Henry Van Arsdale, (Seal) Acting Commissioner of Patents.

ous that said separation or filtration step may be omitted entirely or a part only of the calcium sulphate formed may be removed. Thus, it may be desirable to effect decomposition of the thiosulphate in the presence of a part or all of the calcium sulphate, whereby a composite zinc sulphide-calcium sulphate pigment of controlled and widely varying composition results from a practice of the invention.

I claim as my invention:

1. A process for producing a zinc sulphide pigment, comprising reacting calcium thiosulphate with an aqueous solution of zinc sulphate, boiling the resultant zinc thiosulphate to effect its decomposition in the substantial absence of SO₂ evolution, maintaining the zinc thiosulphate solution during boiling at a pH of between about 4.0 and 6.0 by addition of an alkaline reagent, and thereafter calcining the zinc sulphide precipitate to develop its pigment properties.

2. A process for producing a composite zinc sulphide-calcium sulphate pigment, comprising reacting calcium thiosulphate with an aqueous solution of zinc sulphate, subjecting the resultant solution of zinc thiosulphate to boiling to decompose said thiosulphate, maintaining the thiosulphate solution during boiling at a pH value between about 5.0 and 5.5 by adding an alkaline calcium compound to neutralize the acidity developed during said decomposition, and thereafter calcining the precipitated zinc sulphate to develop its pigment properties.

3. A process for producing an insoluble sulphide pigment composition, comprising reacting in aqueous solution an alkaline earth metal thiosulphate with a soluble salt of a metal from the group consisting of zinc, cadmium and antimony, heating a solution of the resultantly formed thiosulphate compound and effecting its decomposition in the substantial absence of SO₂ evolution and in the presence of an alkaline agent adapted to neutralize the acidity which develops during said decomposition, and recovering the precipitated sulphate pigment.

4. A process for producing an insoluble sulphide pigment, comprising reacting in solution an alkaline earth metal thiosulphate with a soluble salt of a metal from the group consisting of zinc, cadmium and antimony, decomposing by heating and without substantial SO₂ evolution the resultantly formed thiosulphate compound while in aqueous solution, during said decomposition maintaining said aqueous solution at a pH of from about 4.0 to 6.0 by alkaline agent addition, and recovering and calcining the precipitated sulphide to develop its pigment properties.

5. A process for producing a sulphide pigment, comprising reacting an alkaline earth metal thiosulphate with a soluble sulphate of a metal from the group consisting of zinc, cadmium and antimony, decomposing by boiling and in the substantial absence of SO₂ evolution the thiosulphate compound which forms, effecting such decomposition in the presence of an alkaline agent adapted to neutralize the acidity which develops during such boiling, and recovering and calcining the precipitated pigment.

6. A process for producing a zinc sulphide pigment, comprising reacting calcium thiosulphate with an aqueous solution of zinc sulphate, decomposing the zinc thiosulphate formed in the substantial absence of SO₂ evolution by boiling said zinc thiosulphate and neutralizing the acidity which develops during said decomposition by addition of an alkaline agent, and calcining the zinc sulphide precipitate to develop its pigment properties.

7. A process for producing a cadmium sulphide pigment comprising reacting calcium thiosulphate with an aqueous solution of cadmium sulphate, decomposing by heating the resultant cadmium thiosulphate while in aqueous solution and in the substantial absence of SO₂ evolution, neutralizing the acidity developed during said decomposition by adding an alkaline agent to said solution, and calcining the recovered cadmium sulphide precipitate to develop its pigment properties.

8. A process for producing an antimony sulphide pigment comprising reacting calcium thiosulphate with an aqueous solution of antimony sulphate, decomposing by heating the resultant antimony thiosulphate while in aqueous solution and in the substantial absence of SO₂ evolution, neutralizing the acidity developed during said decomposition by adding an alkaline agent to said solution, and calcining the recovered antimony sulphide precipitate to develop its pigment properties.

JAMES ELIOT BOOGE.

CERTIFICATE OF CORRECTION.

Patent No. 2,173,895. September 26, 1939.

JAMES ELIOT BOOGE.

It is hereby certified that error appears in the printed specification of the above numbered patent requiring correction as follows: Page 1, first column, line 11, for "recation" read reaction; page 3, first column, lines 31 and 44, claims 2 and 3 respectively, for the word "sulphate" read sulfide; and that the said Letters Patent should be read with this correction therein that the same may conform to the record of the case in the Patent Office.

Signed and sealed this 7th day of November, A. D. 1939.

Henry Van Arsdale, (Seal) Acting Commissioner of Patents.